(12) United States Patent
Fendler et al.

(10) Patent No.: US 11,788,848 B2
(45) Date of Patent: Oct. 17, 2023

(54) METHOD FOR DETERMINING AN UPDATED TRAJECTORY FOR A VEHICLE

(71) Applicant: Bayerische Motoren Werke Aktiengesellschaft, Munich (DE)

(72) Inventors: Tamas Fendler, Krailing (DE); Robert Knorrn, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 351 days.

(21) Appl. No.: 17/253,051

(22) PCT Filed: Jun. 24, 2019

(86) PCT No.: PCT/DE2019/100582
§ 371 (c)(1),
(2) Date: Dec. 16, 2020

(87) PCT Pub. No.: WO2020/001700
PCT Pub. Date: Jan. 2, 2020

(65) Prior Publication Data
US 2021/0278225 A1 Sep. 9, 2021

(30) Foreign Application Priority Data
Jun. 27, 2018 (DE) .................... 10 2018 210 510.3

(51) Int. Cl.
*B60W 60/00* (2020.01)
*B60W 50/06* (2006.01)
(Continued)

(52) U.S. Cl.
CPC ......... *G01C 21/3407* (2013.01); *B60W 50/06* (2013.01); *B60W 60/001* (2020.02);
(Continued)

(58) Field of Classification Search
CPC . G01C 21/3407; B60W 50/06; B60W 60/001; B60W 2510/18; B60W 2510/20;
(Continued)

(56) References Cited

U.S. PATENT DOCUMENTS

| 9,279,691 B2 | 3/2016 | Kaehler et al. |
| 2013/0218467 A1 | 8/2013 | Ogawa et al. |

(Continued)

FOREIGN PATENT DOCUMENTS

| CN | 101770690 A | 7/2010 |
| DE | 10 2014 223 000 A1 | 5/2016 |

OTHER PUBLICATIONS

PCT/DE2019/100582, International Search Report dated Nov. 7, 2019 (Two (2) pages).

*Primary Examiner* — Kira Nguyen
(74) *Attorney, Agent, or Firm* — Crowell & Moring LLP (57) ABSTRACT

A method for determining an updated trajectory at a certain time point for the longitudinal and/or lateral control of a vehicle. The method includes determining short-range trajectory candidates in an immediate vicinity of a trajectory determined at a preceding time point, the short-range trajectory candidates being determined with a relatively fine value resolution of one or more state variables of the vehicle. In addition, the method includes determining at least one long-range trajectory candidate outside of the immediate vicinity of the trajectory determined at the preceding time point, the long-range trajectory candidate being determined with a relatively coarse value resolution of the one or more state variables. Furthermore, the method includes determining the updated trajectory at the certain time point on the basis of the determined short-range trajectory candidates and on the basis of the determined long-range trajectory candidate.

15 Claims, 3 Drawing Sheets

(51) Int. Cl.
*G05D 1/02* (2020.01)
*G01C 21/34* (2006.01)
*B60W 30/09* (2012.01)
*B60W 30/18* (2012.01)

(52) U.S. Cl.
CPC ........... *G05D 1/0212* (2013.01); *B60W 30/09* (2013.01); *B60W 30/18163* (2013.01); *B60W 2510/18* (2013.01); *B60W 2510/20* (2013.01); *B60W 2520/105* (2013.01); *G05D 2201/0213* (2013.01)

(58) Field of Classification Search
CPC .......... B60W 2520/105; G05D 1/0212; G05D 2201/0213
See application file for complete search history.

(56) References Cited

U.S. PATENT DOCUMENTS

| | | | |
|---|---|---|---|
| 2016/0225261 A1* | 8/2016 | Matsumoto | B62D 15/0255 |
| 2017/0242133 A1* | 8/2017 | Yilmaz | G01C 21/206 |
| 2017/0313313 A1* | 11/2017 | Asakura | B60W 30/12 |
| 2019/0359202 A1* | 11/2019 | Zhu | G05D 1/0242 |

* cited by examiner

METHOD FOR DETERMINING AN UPDATED TRAJECTORY FOR A VEHICLE

BACKGROUND AND SUMMARY OF THE INVENTION

The invention relates to a method and to a corresponding device for determining a trajectory for the control and/or regulation of the transverse and/or longitudinal control of a vehicle during a driving maneuver.

Vehicles (in particular road motor vehicles) increasingly have partially or highly automated driving functions. A central aspect of a partially or highly automated driving function is the planning of the most optimum possible trajectory of the vehicle, by which collisions with other road users are avoided, and by which the highest possible level of driving comfort is enabled. The repeated determination of such a trajectory (for example an evasion trajectory) while carrying out a driving maneuver is linked to a high level of computing effort, which typically can only be provided to a limited extent by control units in a vehicle.

The present document relates to the technical problem of enabling a repeated determination of an optimum trajectory for a vehicle during a driving maneuver with a reduced computing effort.

The object is achieved by each of the independent claims. Advantageous embodiments are described, inter alia, in the dependent claims. It is noted that additional features of a claim dependent on an independent claim, without the features of the independent claim or only in combination with a subset of the features of the independent claim, can form a separate invention which is independent of the combination of all features of the independent claim and can be made the subject matter of an independent claim, a divisional application, or a subsequent application. This applies in the same way to technical teachings described in the description which can form an invention independent of the features of the independent claims.

According to one aspect, a method for determining an updated trajectory at a specific point in time (for example at the point in time (n+1) of a sequence of (possibly equidistant) points in time) is described. The trajectory can be used for the (automated) longitudinal and/or transverse control of a vehicle, in particular a road motor vehicle. In particular, an updated trajectory can be used to determine a steering specification for a power steering system of the vehicle and/or a deceleration specification for a braking system of the vehicle and/or an acceleration specification for a drive of the vehicle. The longitudinal and/or transverse control of a vehicle can thus take place as a function of a (continuously updated) trajectory.

A trajectory indicates a time curve or a chronological sequence of values of one or more state variables of the vehicle starting from an initial state up to an end state. Exemplary state variables are a position $x_1(k)$ of the vehicle, a velocity $\dot{x}_1(k)$ of the vehicle, an acceleration $\ddot{x}_1(k)$ of the vehicle, and/or a jerk $x_1^{(3)}(k)$ of the vehicle.

The method comprises determining close-range trajectory candidates in a direct environment or in a vicinity of a trajectory planned at a preceding point in time. The method can be carried out repeatedly for a sequence of points in time, in particular for a sequence of equidistant points in time. The preceding point in time n can be the point in time of the sequence of points in time directly before the determined point in time n+1 in this case. A trajectory determined at a preceding point in time can be updated at each of the points in time. The state of the vehicle can change along the sequence of points in time here. The state change of the vehicle can be effectuated at least partially as a function of the repeatedly determined or updated trajectory here.

The close-range trajectory candidates can be determined with a relatively fine value resolution of the one or more state variables. Therefore, it is possible to search in a direct environment of the trajectory determined at the preceding time step with relatively high accuracy for an updated version of the trajectory (wherein the updated trajectory originates from an updated initial state).

The direct environment or the vicinity typically represents here a limited partial space of the overall solution space for possible trajectory candidates. In particular, the updated trajectory can be part of an overall solution space of possible trajectory candidates. The direct environment of the trajectory planned at the preceding point in time typically represents a partial solution space of close-range trajectory candidates from the overall solution space of possible trajectory candidates.

The direct environment of the trajectory planned at the preceding point in time can be such that the partial solution space of close-range trajectory candidates comprises 20%, 10%, or less of the overall solution space of trajectory candidates. A local delimited, detailed search for an updated trajectory in the direct environment of the previously determined trajectory can thus take place efficiently. The relatively probable case can thus be covered that the updated trajectory is located in the direct environment of the previously determined trajectory.

Moreover, the method comprises determining at least one (typically of multiple) long-range trajectory candidates outside the direct environment of the trajectory planned at the preceding point in time. The one or more long-range trajectory candidates can thus be taken from the part of the overall solution space which is not part of the partial solution space of close-range trajectory candidates.

The at least one long-range trajectory candidate can be determined with a relatively coarse value resolution of the one or more state variables. In particular, the value resolution for the determination of the long-range trajectory candidates can be 2, 3, 4, 5, 10 times or more coarser than the value resolution for the determination of the close-range trajectory candidates. Therefore, one or more long-range trajectory candidates for the updated trajectory to be determined can thus be determined in an efficient but relatively inaccurate manner. The relatively improbable case can thus be taken into consideration that the updated trajectory is not located in the direct environment of the previously determined trajectory (for example, due to a short-term change of the driving situation in the environment of the vehicle).

The method furthermore comprises determining the updated trajectory at the specific point in time on the basis of the determined close-range trajectory candidates and on the basis of the one or more determined long-range trajectory candidates. For this purpose, a trajectory candidate can be selected as an updated trajectory from the determined close-range trajectory candidates and the determined one or more long-range trajectory candidates. The selection can take place here in such a way that one or more secondary conditions are met with respect to at least one obstacle in an environment of the vehicle (for example to determine a collision-free updated trajectory). Alternatively or additionally, the selection can take place in such a way that the value of a quality functional is improved, in particular optimized. In this case, the value of the quality functional for a trajectory candidate can be dependent, for example, on the driving comfort of the trajectory candidate upon the implementation by the vehicle.

The method thus enables efficient and precise updating of a trajectory for the (automated) transverse and/or longitudinal control of a vehicle. The updating can take place at a specific frequency (e.g., 10 Hz, 20 Hz, 50 Hz, or more), for example during the execution of an automated driving maneuver. The fact is utilized in the updating here that an updated trajectory is located with a relatively high probability in the immediate environment of the previously determined trajectory. Therefore, the determination of precise trajectory candidates takes place in the direct environment of the previously determined trajectory.

In order to nonetheless cover the relatively improbable case that the updated trajectory is not located in the direct environment of the previously determined trajectory, one or more trajectory candidates are determined outside the direct environment with a relatively low accuracy. If one of these long-range trajectory candidates should be selected, a precise determination of the trajectory (within the direct environment of the determined trajectory) thus takes place directly during the next update of the trajectory (i.e., directly during the following time step).

The value resolution of a state variable describes, for example, how finely the possible values of a state variable are scanned during the determination of trajectory candidates. The value resolution can be the (uniform) scanning width between different scanning points of a scan of the possible values of a state variable.

The method can comprise determining a distance value of a distance amount between an end state for the updated trajectory and an end state for the (previously determined) trajectory. The end state can be specified, for example, by a driving function and/or by a driver assistance system of the vehicle. There is typically no essential change of a desired end state in this case. However, a significant change of the desired end state can possibly occur (for example, in the event of a termination of a driving maneuver).

The determination of the close-range trajectory candidates and/or the determination of at least one long-range trajectory candidate can take place as a function of the distance value.

In particular, the determination of close-range trajectory candidates and the determination of at least one long-range trajectory candidate cannot take place using value resolutions of differing fineness if the distance value is greater than a distance threshold value, and/or can only take place if the distance value is less than the distance threshold value. Thus, for example in the event of a termination of a driving maneuver, efficiently switching to a new end state for a trajectory to be newly planned can be effectuated.

Alternatively or additionally, the direct environment of the trajectory planned at the preceding point in time, in particular the size of the direct environment or the proportion of the possible trajectory candidates within the direct environment, can be dependent on the distance value. In this case, the environment, in particular the size of the environment and/or the proportion of the possible trajectory candidates within the direct environment, can be enlarged with increasing distance value. The trajectory planning can thus be adapted in a reliable and flexible manner to changing target specifications.

The method can comprise determining a tolerance range around a predetermined end state of the updated trajectory. In other words, tolerances can be permitted in the planning of the end values of one or more state variables. The overall solution space of possible trajectory candidates can thus be enlarged, which typically increases the quality of a determined trajectory (with respect to the quality functional underlying the trajectory planning). The consideration of tolerance ranges is possible here due to the reduced computing effort of the described method.

The close-range trajectory candidates and/or the one or more long-range trajectory candidates can then be determined in consideration of the tolerance range around the predetermined end state. The quality of an updated trajectory can thus be increased.

The determination of a trajectory candidate can comprise the determination of the starting state of the updated trajectory, wherein the starting state comprises starting values for one or more state variables of the vehicle. The starting state can be determined for example on the basis of sensor data from one or more sensors of the vehicle.

Furthermore, the (desired or predetermined) end state of the updated trajectory can be determined, wherein the end state comprises end values for one or more of the state variables of the vehicle. A chronological sequence of values of the one or more state variables can then be determined as the trajectory candidate, wherein the chronological sequence of values of the one or more state variables transfers the starting state into the end state. The chronological sequence of values of the one or more state variables can be determined here as a function of a state model of the vehicle. Trajectory candidates can thus be determined, which can be reliably implemented or traveled by a vehicle.

According to a further aspect, a method is described for determining an updated trajectory at a specific point in time (for example, the point in time n+1) for the longitudinal and/or transverse control of a vehicle. The aspects described in this document are also applicable to this method. A trajectory indicates in this case a time curve of one or more state variables of the vehicle from a starting state to an end state.

The method comprises the determination of trajectory candidates in a specific environment of a trajectory determined at a preceding point in time (for example, at the point in time n). In this case, the value resolution of the one or more state variables during the determination of trajectory candidates is reduced by the distance to the trajectory determined at the preceding point in time (for example, continuously). Furthermore, the method comprises determining the updated trajectory at the specific point in time on the basis of the determined trajectory candidates.

A trajectory can comprise the values of one or more state variables at a sequence of points in time (starting from a first point in time, at which the starting state exists, up to a last point in time, at which the end state exists). The points in time can have an interval of 100 ms, 50 ms, 20 ms, or less to one another. To determine a distance between two trajectories, a distance value (for example, a square distance or an absolute distance) can be determined for each state variable and for each point in time of the trajectories. Therefore, a sequence of distance values can be determined for each state variable, and, for example, a mean distance value for this state variable can be determined on the basis of the sequence of distance values. The distance between the trajectories can then be determined as a total or as a (possibly weighted) mean value of the (average) distance values of the state variables of the trajectories. A rising distance between two trajectories thus indicates a rising distance of the values of the state variables of the two trajectories.

According to a further aspect, a device is described which is designed to execute one of the methods described in this document.

According to a further aspect, a road motor vehicle (in particular a passenger vehicle or a truck or a bus) is described, which comprises the device described in this document.

According to a further aspect, a software (SW) program is described. The SW program can be designed to be executed on a processor (for example on a control unit of a vehicle), and to thus execute one of the methods described in this document.

According to a further aspect, a storage medium is described. The storage medium can comprise a SW program, which is designed to be executed on a processor, and to thus execute one of the methods described in this document.

It is to be noted that the methods, devices, and systems described in this document can be used both alone and also in combination with other methods, devices, and systems described in this document. Furthermore, any aspects of the methods, devices, and systems described in this document can be combined with one another in a variety of ways. In particular, the features of the claims can be combined with one another in a variety of ways.

The invention is described in more detail hereinafter on the basis of exemplary embodiments.

DETAILED DESCRIPTION OF THE DRAWINGS

Figure 1:
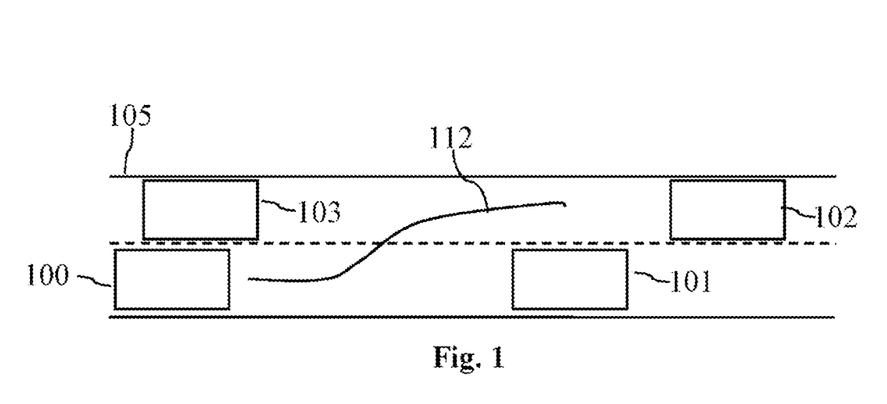
FIG. 1 shows an exemplary traffic situation.

As described at the outset, the present document relates to the technical problem of determining or updating a safe longitudinal and/or transverse trajectory for a vehicle (which is also referred to as an ego vehicle) in an efficient manner. In this context, FIG. 1 shows an exemplary traffic situation. The ego vehicle 100 drives on a multilane roadway 105. A vehicle 101 on the same lane of the roadway 101 in front of the ego vehicle 100 (i.e., a vehicle 101 on the ego lane) can possibly have a relatively low driving velocity. The ego vehicle 100 then has, for example, the option of carrying out a passing maneuver and changing the lane along a trajectory 112, in order to pass the vehicle 101. A collision with other vehicles 102, 103 is to be avoided here.

To carry out the maneuver shown in FIG. 1, a control unit or a device of the ego vehicle 100 can determine and periodically update a trajectory 112, which meets one or more boundary or secondary conditions. Inter alia, driving-dynamic aspects can be taken into consideration in the determination of a trajectory 112. In particular, a trajectory 112, which can be realistically driven using the vehicle 100, can be determined as a function of one or more vehicle parameters and/or as a function of a current driving situation. In this case, a curvature which can be implemented by the vehicle 100 can be taken into consideration. Further examples of vehicle parameters which can be taken into consideration are a transverse and/or longitudinal acceleration or deceleration (which can be implemented in the current driving situation) of the vehicle 100.

Furthermore, a trajectory 112 is typically determined in such a way that a collision with the detected objects or obstacles 101, 102, 103 in the environment of the ego vehicle 100 can be avoided using the trajectory 112. The trajectory 112 thus determined can then be transferred to one or more regulators for the transverse control and/or the longitudinal control of the vehicle 100 and can be used by the one or more regulators for the transverse control and/or the longitudinal control of the vehicle 100.

The determination of a trajectory 112 preferably takes place in a curved coordinate system in relation to a roadway course. The method described in this document for determining and/or for updating a trajectory can therefore comprise the step of transforming state data or values of state variables of the vehicle 100 (e.g., the position of the vehicle 100, a yaw angle of the vehicle 100, and/or a steering angle of the vehicle 100) from a Cartesian coordinate system into a (curved) Frenet coordinate system.

Figure 3:
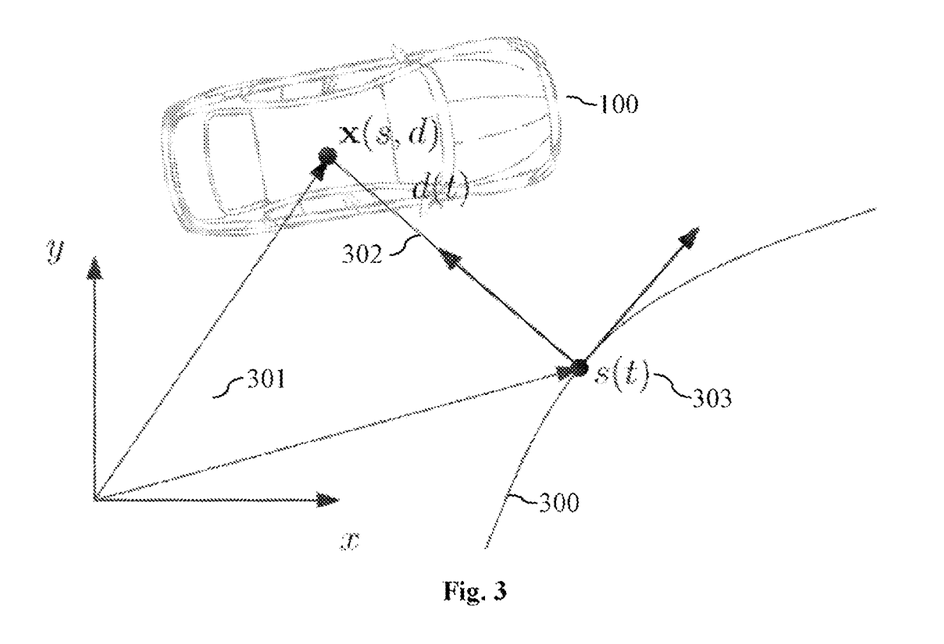
FIG. 3 shows an exemplary transformation into a coordinate system in relation to a reference line of a vehicle.

The decurving of the roadway course (by a curved coordinate system) is shown by way of example in FIG. 3. For the decurving, measurement signals with respect to the state of the vehicle 100 are transformed into a lane coordinate system. The trajectory planning itself thus does not take place in a Cartesian coordinate system 301, but rather in a Frenet coordinate system. The Frenet coordinate system is described with respect to a reference curve 300 (for example, the lane center of a roadway curve). The vehicle position is thus described by the variables $s(t)$ 303 in the longitudinal direction and $d(t)$ 302 in the transverse direction. $\dot{s}(t)$ and $\dot{d}(t)$ describe the longitudinal and transverse velocity and $\ddot{s}(t)$ and $\ddot{d}(t)$ describe the longitudinal and transverse acceleration, respectively.

Both the vehicle intrinsic movement and also the road users or objects 101, 102, 103 to be taken into consideration can be taken into consideration in the Frenet coordinate system. This transformation clearly corresponds to the decurving of the coordinate system 301 and thus permits the separate optimization of the longitudinal and transverse movement of the vehicle 100. After determination of a trajectory 112 (i.e., after determination of a chronological sequence of values of the state variables of the vehicle 100), the determined values of the state variables can be transformed back into the Cartesian coordinate system 301 again, before they are used to regulate the longitudinal and transverse control of the vehicle 100.

The transverse and longitudinal movement of a vehicle 100 may be described as an optimum control problem having output $s(t)=x_1(t)$ (in the case of the longitudinal planning) or $d(t)=x_1(t)$ (in the case of the transverse planning) of an integrator system (i.e., of a model of the dynamics of a vehicle 100). In this case, $x_1(t)$ is a first state variable of the vehicle 100, which describes the position of the vehicle 100 (in the longitudinal direction or in the transverse direction). The jerk $x_1^{(3)}(t)$ (i.e., the third derivative of the state variable $x_1(t)$) and/or the derivative of the jerk $x_1^{(4)}(t)$ (i.e., the fourth derivative of the state variable $x_1(t)$) can be defined as the input of the integrator system.

An exemplary integrator system or state model of a vehicle 100 can be defined as follows:

$$\dot{x} = \begin{bmatrix} 0 & 1 & 0 & 0 \\ 0 & 0 & 1 & 0 \\ 0 & 0 & 0 & 1 \\ 0 & 0 & 0 & 0 \end{bmatrix} x + \begin{bmatrix} 0 \\ 0 \\ 0 \\ 1 \end{bmatrix} u$$

wherein the input variable u corresponds to the derivative of the jerk $x_1^{(4)}(t)$. The state of a vehicle 100 at a specific point in time t can be described by the state vector $x^T=[x_1,x_2,x_3,x_4]$, wherein $x_2(t)=\dot{x}_1(t), x_3(t)=\dot{x}_2(t)$, and $x_4(t)=\dot{x}_3(t)$.

A trajectory, i.e., a chronological sequence of states x(t), or in the time-discrete range x(k), with k=1, ..., $N_{lon}$, wherein $N_{lon}$ is the planning horizon, can now be determined. The planning horizon can be, for example, 5 seconds, 10 seconds, or more. The individual points in time can have an interval of 100 ms, 50 ms, 20 ms, or less in relation to one another. In the scope of the planning of a trajectory, the state sequence x(k) can be determined, by which a cost or quality function is reduced, in particular minimized, or optimized. It can be specified in the cost function here that the vehicle 100 has a specific target position at the end of the planning horizon. Alternatively or additionally, it can be specified that the state sequence meets one or more comfort criteria (for example, with respect to the jerk).

To calculate a transverse trajectory, a target range $d_{target}$ can be specified as a desired endpoint of a trajectory, which target range indicates, for example a range on an adjacent lane (as shown in FIG. 1). This target range can be defined, for example as a desired end position of the end state $x(t_f)$ or $x(N_{lon})$, possibly with $x_1(t_f)=x_1(N_{lon})=d_{target}$. In this case, the planning horizon for the planning of a transverse trajectory and the planning horizon for the planning of a longitudinal trajectory can differ from one another. The planning horizon for a transverse trajectory is typically shorter than for a longitudinal trajectory (for example, 6 s versus 10 s).

For example, the following function can be used (in particular reduced or minimized) as the transverse selection measure or as the transverse quality measure for the determination of a trajectory for the transverse control of the vehicle 100:

$$J_{transverse} = \frac{1}{2}\int_0^{t_f}\left(d^{(4)}(t)\right)^2 dt + k_{q1}(d_{target} - d(t_f))^2 + k_{q2}t_f$$

In this case, the first expression evaluates the development of the derivative of the jerk along the trajectory 112 (and thus the comfort). The second expression evaluates the deviation of the end position $d(t_f)$ from the target position $d_{target}$. Furthermore, the third expression evaluates the chronological length of the trajectory 112. The formation of the trajectory 112 can be influenced via the weighting factors $k_{q1}$ and $k_{q2}$.

The longitudinal planning can take place in a similar manner. For example, the following longitudinal selection measure or longitudinal quality functional can be used (in particular reduced or minimized) for the longitudinal planning $$J_{longitudinal} = \frac{1}{2}\int_0^{t_f}\left(s^{(4)}(t)\right)^2 dt + k_{l1}(s_{target} - s(t_f))^2 + k_{l2}t_f,$$

in particular if a specific target position $s_{target}$ is to be reached. Alternatively, the following longitudinal selection measure or longitudinal quality functional can be used $$J_{longitudinal} = \frac{1}{2}\int_0^{t_f}\left(s^{(4)}(t)\right)^2 dt + k_{l1}(\dot{s}_{target} - \dot{s}(t_f))^2 + k_{l2}t_f,$$

in particular if a specific target velocity $\dot{s}_{target}$ is to be reached.

A (longitudinal and/or transverse) trajectory can thus be determined, wherein a trajectory indicates the state x of the vehicle 100, in particular the position s(k) of the vehicle 100, at a plurality of scanning points in time k, where k=1, ..., $N_{lon}$, wherein $N_{lon}$ is the planning horizon. It is then to be checked which of the plurality of trajectories meets one or more secondary conditions with respect to obstacles, in particular with respect to other vehicles 101, 102, 103. In particular, a plurality of determined trajectory candidates can be sorted according to a rising value of the respective quality functional. The trajectory candidate can be selected from the plurality of trajectory candidates as the trajectory 112, which meets the one or more secondary conditions with respect to obstacles 101, 102, 103 and at the same time has the lowest or most optimum possible value of the quality functional.

At a specific point in time n, an optimum trajectory $x_{opt}(k)$, where k=1, ..., $N_{lon}$, can thus be determined. The optimum trajectory can be used at the specific point in time for the automated longitudinal and/or transverse control of the vehicle 100.

Figure 2:
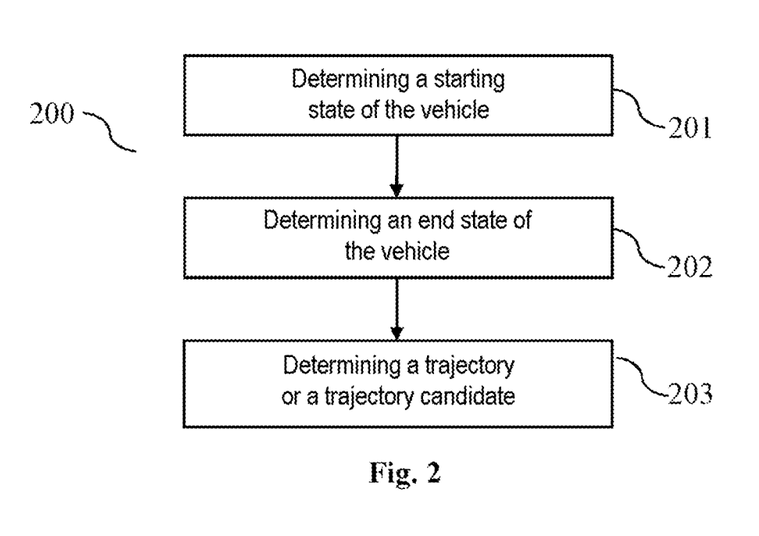
FIG. 2 shows a flow chart of an exemplary method for determining a trajectory or a trajectory candidate.

The process of determining a respectively optimum trajectory, i.e., in particular the method 200 shown in FIG. 2, can be repeated for a sequence of points in time n. In this case, at every point in time n the respectively current starting state x(0) can be determined (step 201);

the desired end state or target point $x(N_{lon})$ can be specified (step 202); and an optimum trajectory $x_{opt}(k)$, where k=1, ..., $N_{lon}$ can be determined by means of the above-described optimization method (step 203).

Figure 4A:
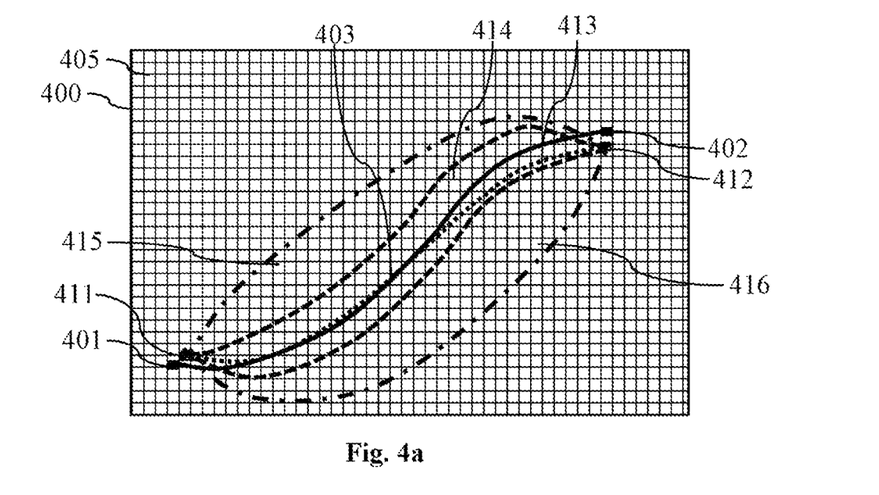
FIG. 4a shows an exemplary close range of a planned trajectory.

FIG. 4 shows an exemplary planned or optimum trajectory $x_{opt}(k)$ 403 between a starting state x(0) 401 and an end state $x(N_{lon})$ 402. The trajectory 403 is shown in a scanning network 400, wherein the scanning network 400 indicates the possible values of the different state variables $x_1, x_2, x_3, x_4$ as scanning regions 405. The planned trajectory $x_{opt}(k)$ 403 can have been ascertained at a specific point in time n by means of the method 200.

Furthermore, FIG. 4 shows an updated starting state x(0) 411 of the vehicle 100 at a following point in time n+1. The vehicle 100 can have been guided in an at least partially automated manner to the updated starting state x(0) 411 as a function of the trajectory $x_{opt}(k)$ 403 planned for the point in time n.

Furthermore, an updated end state $x(N_{lon})$ 412 can be specified for the following point in time n+1, for example by the driver assistance system, for which the trajectory 403, 413 is to be determined. For example, it can be specified by a lane change assistant that furthermore a lane change is to be carried out. The updated end state $x(N_{lon})$ 412 for the following point in time n+1 can correspond here to the end state $x(N_{lon})$ 402 for the point in time n, or can be in the immediate vicinity thereof.

It can be assumed that the trajectory 413 to be planned or the updated trajectory 413 for the following point in time n+1 is located in the immediate vicinity of the already planned trajectory 403 for the point in time n, in particular if the target point specifications (i.e., the end state $x(N_{lon})$ 412 to be reached) do not change significantly. A close range 414 of possible trajectory candidates in the direct environment of the planned trajectory $x_{opt}(k)$ 403 can thus be determined for the point in time n. The trajectory candidates from the close range 414 of the last planned trajectory $x_{opt}(k)$ 403 can be referred to as the close-range trajectory candidates. The close range 414 is shown in FIG. 4 by two dashed curves around the last planned trajectory $x_{opt}(k)$ 403. The close-range trajectory candidates can be determined with a relatively high or fine resolution of the different state variables $x_1$, $x_2$, $x_3$, $x_4$.

The trajectory can then be selected from the determined close-range trajectory candidates, which meets the one or more secondary conditions and improves, in particular optimizes, the quality functional at the same time.

Although it is relatively probable that the trajectory 413 to be planned or updated for the following point in time n+1 is arranged in the immediate vicinity of the already planned or determined trajectory 403 for the point in time n, it is not possible to preclude that (for example due to an abrupt change of the situation in the environment of the vehicle 100), the trajectory 413 to be planned for the following point in time n+1 is located outside the close range 414. For this reason, one or more long ranges 415, 416 can be defined for trajectory candidates outside the close range 414. The one or more long ranges 415, 416 are delimited in FIG. 4a by a dashed line, on the one hand, and a dot-dash line, on the other hand. In the one or more long ranges 415, 416, one or more long-range trajectory candidates can be determined in each case using a relatively low resolution of the different state variables $x_1$, $x_2$, $x_3$, $x_4$.

It can then be checked whether one of the long-range trajectory candidates, which also meets the one or more secondary conditions, supplies a better value of the quality functional than the (optimum) close-range trajectory candidate. Depending on the value of the quality functional, either the close-range trajectory candidate or one of the long-range trajectory candidates can then be selected as the updated trajectory 413 for the following point in time n+1. The updated trajectory 413 is shown in FIG. 4a by a dotted line.

Due to the use of a relatively high or fine resolution only in the close range 414 of the previously planned trajectory 403 and due to the use of a relatively low or rough resolution outside the close range 414, the computing effort can be significantly reduced in the determination of a trajectory 413.

If, at a specific point in time n, a long-range trajectory candidate was selected as the planned trajectory 403 instead of a close-range trajectory candidate, the long-range trajectory candidate, due to the relatively low or rough resolution which was used in the determination of the long-range trajectory candidate, thus possibly does not represent the optimum trajectory in the value environment of the determined long-range trajectory candidate. Due to the fact that upon execution of the method at the following point in time n+2, close-range trajectory candidates are determined in the direct value environment of the planned trajectory 403 with a relatively high or fine resolution, however, it can be ensured that an optimum trajectory can be found at the following point in time n+2. Finding an optimum trajectory is thus distributed onto multiple time steps of the method. Therefore, finding an optimum trajectory over multiple computing or time steps is enabled, and at the same time the running time or the computing time for the determination of the trajectory is reduced. In other words, by turning away from finding an optimum solution at every point in time n, the computing effort of the trajectory planning can be significantly reduced without thus significantly impairing the quality of the trajectory planning (since the finding of an optimum trajectory is only shifted by at most one time step).

As already described above, in the scope of the planning of a trajectory 403, 413 at a point in time n, a specification can be made with respect to the target state $x(N_{lon})$ 402, 412. The solution space of possible trajectory candidates is restricted here by the definition of a fixed target state $x(N_{lon})$ 402, 412. The specification of a fixed target state $x(N_{lon})$ 402, 412 can possibly not be required for a specific driving function or for a specific driver assistance system. For example, it can optionally be possible to enable a specific tolerance range 422 around a desired target state $x(N_{lon})$ 412 (see FIG. 4b). The solution space 424 of trajectory candidates can be expanded by permitting a tolerance range 422 around a desired target state $x(N_{lon})$ 412, whereby planning trajectories 413 which have an improved value of the quality functional, and thus have a higher "optimality" is enabled.

Figure 4B:
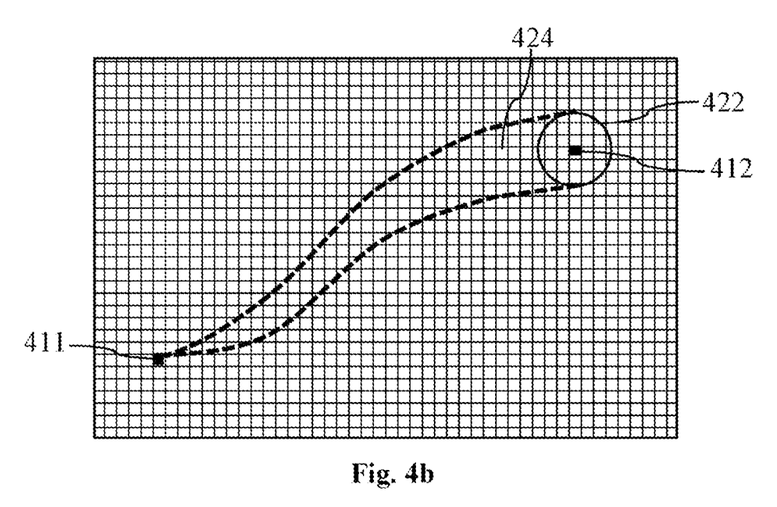
FIG. 4b shows an exemplary tolerance range for an end state of a trajectory.

In other words, the number and/or the accuracy of target point specifications can be reduced and at least partially replaced by soft specifications or tolerance ranges 412. The solution space 424 can thus be expanded in order to improve iteratively finding an optimum trajectory 413.

Figure 5:
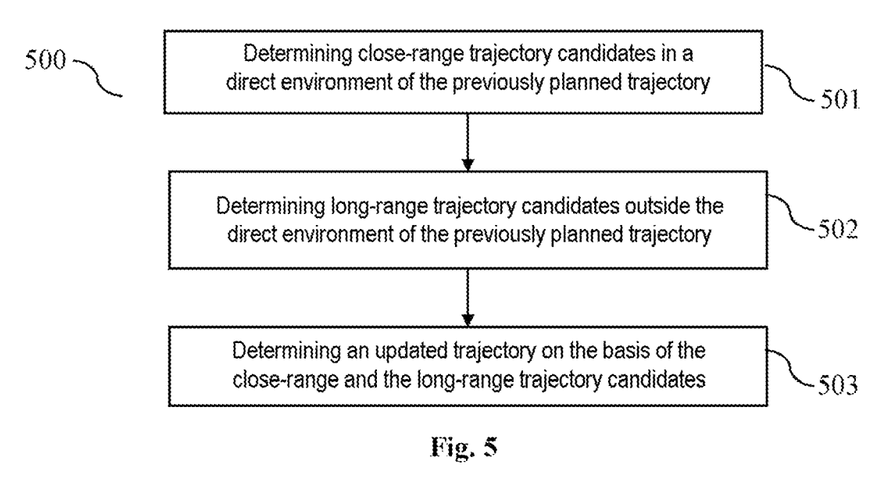
FIG. 5 shows a flow chart of an exemplary method for determining an updated trajectory.

FIG. 5 shows a flow chart of an exemplary method 500 for determining an updated trajectory 413 at a specific point in time (for example at the point in time n+1) for the longitudinal and/or transverse control of a vehicle 100. In this case, a trajectory 403, 413 indicates a time curve of one or more state variables of the vehicle 100 from a starting state 401, 411 to an end state 402, 412. Exemplary state variables are the position, the velocity, the acceleration, and/or the jerk of the vehicle 100.

The method 500 comprises determining 501 close-range trajectory candidates in a direct environment or in a close range 414 of a trajectory 403 determined at a preceding point in time (for example at the point in time n). In this case, the close-range trajectory candidates are determined with a relatively fine value resolution of the one or more state variables.

Furthermore, the method 500 comprises determining 502 at least one long-range trajectory candidate outside the direct environment 414 (i.e., outside the close range 414) of the trajectory 403 determined at the preceding point in time. In this case, the at least one long-range trajectory candidate is determined using a relatively rough value resolution of the one or more state variables (for example, with a value resolution rougher by the factor 2, 3, 4, or more).

The updated trajectory 413 at the specific point in time can then be determined 503 on the basis of the determined close-range trajectory candidates and on the basis of the determined long-range trajectory candidate. In particular, one of the determined trajectory candidates can be selected as the updated trajectory 413. For example, the trajectory candidate can be selected which improves or optimizes the value of a quality functional (and at the same time nonetheless meets one or more secondary conditions with respect to one or more obstacles 102, 103).

By way of the measures described in this document, the number of possible trajectory candidates and thus the required running time for calculating a trajectory 413 on a control unit of a vehicle 100 can be reduced, without impairing the quality of the determined trajectory 413 at the same time.

The present invention is not restricted to the exemplary embodiments shown. In particular, it is to be noted that the description and the figures are only to illustrate the principle of the proposed methods, devices, and systems.

What is claimed is:

1. A method for longitudinal and/or transverse control of a vehicle, comprising the steps of:
    determining, by a control unit of the vehicle, close-range trajectory candidates in a direct environment of a trajectory determined at a preceding point in time, wherein the trajectory indicates a time curve of one or more state variables of the vehicle from a starting state to an end state, and wherein the close-range trajectory candidates are determined using a relatively fine value resolution of the one or more state variables;
    determining, by the control unit, a long-range trajectory candidate outside the direct environment of the trajectory determined at the preceding point in time, wherein the long-range trajectory candidate is determined using a relatively rough value resolution of the one or more state variables;
    determining, by the control unit, an updated trajectory at a specific point in time from the determined close-range trajectory candidates and the determined long-range trajectory candidate, and
    performing automated longitudinal and/or transverse control of the vehicle according to the updated trajectory.

2. The method according to claim 1 further comprising the steps of:
    determining a distance value of a distance amount between an end state for the updated trajectory and an end state for the trajectory determined at the preceding point in time; and
    determining close-range trajectory candidates and/or determining at least one long-range trajectory candidate as a function of the distance value.

3. The method according to claim 2, wherein:
    the direct environment of the trajectory determined at the preceding point in time is dependent on the distance value; and/or
    the determination of close-range trajectory candidates and the determination of at least one long-range trajectory candidate having value resolutions of differing fineness does not take place if the distance value is greater than a distance threshold value, and/or only takes place if the distance value is less than the distance threshold value.

4. The method according to claim 1, wherein:
    the updated trajectory is part of an overall solution space of trajectory candidates;
    the direct environment of the trajectory determined at the preceding point in time represents a partial solution space of close-range trajectory candidates; and
    the direct environment of the trajectory determined at the preceding point in time is such that the partial solution space of close-range trajectory candidates comprises 20%, 10%, or less of the overall solution space of trajectory candidates.

5. The method according to claim 1, wherein the value resolution for the determination of the long-range trajectory candidate is 2, 3, 4, 5, 10 times or more coarser than the value resolution for the determination of the close-range trajectory candidates.

6. The method according to claim 1, wherein
    the method is repeated for a sequence of points in time; and
    the preceding point in time is a point in time of the sequence of points in time lying directly before the specific point in time.

7. The method according to claim 1 further comprising the step of determining a tolerance range around a predetermined end state of the updated trajectory, wherein the close-range trajectory candidates and/or the long-range trajectory candidate are determined in consideration of the tolerance range around the predetermined end state.

8. The method according to claim 1, wherein the determination of a trajectory candidate comprises the steps of:
    determining a starting state of the updated trajectory, wherein the starting state comprises starting values for a plurality of state variables of the vehicle, wherein the plurality of state variables comprises a position of the vehicle, a velocity of the vehicle, an acceleration of the vehicle, and/or a jerk of the vehicle;
    determining an end state of the updated trajectory, wherein the end state comprises end values for one or more of the plurality of state variables of the vehicle; and
    determining, as trajectory candidates, a chronological sequence of values of the plurality of state variables, which transfers the starting state into the end state, wherein the chronological sequence of values of the plurality of state variables is determined as a function of a state model of the vehicle.

9. The method according to claim 1, wherein the determination of the updated trajectory comprises selecting a trajectory candidate from the determined close-range trajectory candidates and the determined long-range trajectory candidate so that:
    one or more secondary conditions with respect to at least one obstacle in an environment of the vehicle are met; and/or
    a value of a quality functional is improved, wherein the quality functional is dependent on driving comfort of a trajectory candidate.

10. The method according to claim 1 further comprising the step of determining a steering specification for a power steering system of the vehicle and/or a deceleration specification for a braking system of the vehicle and/or an acceleration specification for a drive of the vehicle as a function of the updated trajectory.

11. A method for longitudinal and/or transverse control of a vehicle, comprising the steps of:
    determining, by a control unit of the vehicle, trajectory candidates in an environment of a trajectory determined at a preceding point in time, wherein the trajectory indicates a time curve of one or more state variables of the vehicle from a starting state to an end state, and wherein a value resolution of the one or more state variables during the determination of trajectory candidates is reduced with a distance to the trajectory determined at the preceding point in time;
    determining, by the control unit, an updated trajectory at a specific point in time on a basis of the determined trajectory candidates, and
    performing automated longitudinal and/or transverse control of the vehicle according to the updated trajectory.

12. A system for longitudinal and/or transverse control of a vehicle, comprising:
- a memory storing non-transitory computer-readable instructions thereon;
- a control unit configured to carry out autonomous longitudinal and/or transverse control of the vehicle, wherein upon executing the software instructions the control unit is thereby configured to:
- determine close-range trajectory candidates in a direct environment of a trajectory determined at a preceding point in time, wherein the trajectory indicates a time curve of one or more state variables of the vehicle from a starting state to an end state, and wherein the close-range trajectory candidates are determined using a relatively fine value resolution of the one or more state variables;
- determine a long-range trajectory candidate outside the direct environment of the trajectory determined at the preceding point in time, wherein the long-range trajectory candidate is determined using a relatively rough value resolution of the one or more state variables;
- determine an updated trajectory at a specific point in time from the determined close-range trajectory candidates and the determined long-range trajectory candidate; and
- perform automated longitudinal and/or transverse control of the vehicle according to the updated trajectory.

13. A non-transitory computer-readable medium storing instructions that, when executed by a control unit of a vehicle, cause the control unit to perform a method for longitudinal and/or transverse control of the vehicle, comprising:
- determining, by the control unit of the vehicle, close-range trajectory candidates in a direct environment of a trajectory determined at a preceding point in time, wherein the trajectory indicates a time curve of one or more state variables of the vehicle from a starting state to an end state, and wherein the close-range trajectory candidates are determined using a relatively fine value resolution of the one or more state variables;
- determining, by the control unit, a long-range trajectory candidate outside the direct environment of the trajectory determined at the preceding point in time, wherein the long-range trajectory candidate is determined using a relatively rough value resolution of the one or more state variables;
- determining, by the control unit, an updated trajectory at a specific point in time from the determined close-range trajectory candidates and the determined long-range trajectory candidate; and
- performing automated longitudinal and/or transverse control of the vehicle according to the updated trajectory.

14. A system for longitudinal and/or transverse control of a vehicle, comprising:
- a memory storing non-transitory computer-readable instructions thereon;
- a control unit configured to carry out autonomous longitudinal and/or transverse control of the vehicle, wherein upon executing the software instructions the control unit is thereby configured to:
- determine trajectory candidates in an environment of a trajectory determined at a preceding point in time, wherein the trajectory indicates a time curve of one or more state variables of the vehicle from a starting state to an end state, and wherein a value resolution of the one or more state variables during the determination of trajectory candidates is reduced with a distance to the trajectory determined at the preceding point in time;
- determine an updated trajectory at a specific point in time on a basis of the determined trajectory candidates; and
- perform automated longitudinal and/or transverse control of the vehicle according to the updated trajectory.

15. A non-transitory computer-readable medium storing instructions that, when executed by a control unit of a vehicle, cause the control unit to perform a method for longitudinal and/or transverse control of the vehicle, comprising:
- determining, by the control unit of the vehicle, trajectory candidates in an environment of a trajectory determined at a preceding point in time, wherein the trajectory indicates a time curve of one or more state variables of the vehicle from a starting state to an end state, and wherein a value resolution of the one or more state variables during the determination of trajectory candidates is reduced with a distance to the trajectory determined at the preceding point in time;
- determining, by the control unit, an updated trajectory at a specific point in time on a basis of the determined trajectory candidates; and
- performing automated longitudinal and/or transverse control of the vehicle according to the updated trajectory.

* * * * *